(12) United States Patent
Warren et al.

(10) Patent No.: US 8,998,174 B2
(45) Date of Patent: Apr. 7, 2015

(54) DIAPHRAGM FOR A VALVE

(75) Inventors: Peter John Warren, Woking (GB); Stephen Winterbottom, Woking (GB)

(73) Assignee: James Walker & Co. Ltd., Woking, Surrey (GB)

( * ) Notice: Subject to any disclaimer, the term of this patent is extended or adjusted under 35 U.S.C. 154(b) by 354 days.

(21) Appl. No.: 12/993,020

(22) PCT Filed: May 19, 2009

(86) PCT No.: PCT/GB2009/050537
§ 371 (c)(1),
(2), (4) Date: Feb. 3, 2011

(87) PCT Pub. No.: WO2009/141647
PCT Pub. Date: Nov. 26, 2009

(65) Prior Publication Data
US 2011/0114868 A1    May 19, 2011

(30) Foreign Application Priority Data

May 19, 2008  (GB) .................................. 0809084.7

(51) Int. Cl.
*F16K 31/00* (2006.01)
*F16K 1/00* (2006.01)
*F16K 15/00* (2006.01)
(Continued)

(52) U.S. Cl.
CPC ........... *B32B 25/08* (2013.01); *Y10T 156/1002* (2015.01); *B29C 35/02* (2013.01); *B29C 65/5057* (2013.01); *B29C 66/45* (2013.01); *B29C 66/7352* (2013.01); *B29C 66/7375* (2013.01); *B29K 2021/00* (2013.01); *B29L 2031/7506* (2013.01);
(Continued)

(58) Field of Classification Search
CPC ........... F16K 7/12; F16K 7/123; F16K 7/126; F16K 7/14; F16K 7/16; F16K 7/17; F16K 7/20; F16K 25/005
USPC ................ 251/61–61.5, 331, 332, 335.2, 368
See application file for complete search history.

(56) References Cited

U.S. PATENT DOCUMENTS 2,853,270 A * 9/1958 Boteler .......................... 251/331
3,026,909 A * 3/1962 Boteler .......................... 251/331
(Continued)

FOREIGN PATENT DOCUMENTS

DE     10216661 A1    4/2002
EP     1384741 A1     1/2004
(Continued)

OTHER PUBLICATIONS

Precision Polymer Engineering Limited (PPE Ltd.), "A technical guide to Elastomer Compounds and Chemical Compatibility", May 2006, p. 15.*

(Continued)

*Primary Examiner* — John K Fristoe, Jr.
*Assistant Examiner* — Hailey K Do
(74) *Attorney, Agent, or Firm* — Hodgson Russ LLP

(57) ABSTRACT

A diaphragm (20) for a diaphragm valve is described. The diaphragm (20) has a body (22) comprising a first elastomer and a resistant layer (24) comprising a second elastomer having a different composition or formulation. Diaphragms described in examples have good flexibility with a high level of chemical resistance and low surface adhesion. A fixing attachment for fixing the diaphragm in the valve is also described.

13 Claims, 2 Drawing Sheets

(51) Int. Cl.
*B32B 25/08* (2006.01)
*B32B 7/12* (2006.01)
*B32B 25/14* (2006.01)
*F16K 7/12* (2006.01)
*B29C 35/02* (2006.01)
*B29C 65/50* (2006.01)
*B29C 65/00* (2006.01)
*B29K 21/00* (2006.01)
*B29L 31/00* (2006.01)

(52) U.S. Cl.
CPC ............ *B29L 2031/755* (2013.01); *B32B 7/12* (2013.01); *B32B 25/14* (2013.01); *F16K 7/12* (2013.01)

(56) References Cited

U.S. PATENT DOCUMENTS

| | | | | |
|---|---|---|---|---|
| 4,014,514 | A * | 3/1977 | Priese et al. | 251/331 |
| 4,515,347 | A * | 5/1985 | Sitton et al. | 251/328 |
| 4,720,079 | A | 1/1988 | Iizuka et al. | |
| 4,944,487 | A | 7/1990 | Holtermann | |
| 5,907,992 | A * | 6/1999 | Huss | 92/103 F |
| 6,505,814 | B1 | 1/2003 | Satou et al. | |
| 6,508,266 | B2 * | 1/2003 | Iritani et al. | 137/312 |
| 7,191,793 | B2 * | 3/2007 | Maula et al. | 137/341 |
| 2002/0031965 | A1 * | 3/2002 | Carter et al. | 442/175 |
| 2005/0059780 | A1 * | 3/2005 | Bormuth et al. | 525/199 |
| 2007/0241301 | A1 | 10/2007 | Wincek | |
| 2008/0185056 | A1 * | 8/2008 | Diodati et al. | 137/561 R |

FOREIGN PATENT DOCUMENTS

| | | |
|---|---|---|
| GB | 696545 A | 9/1953 |
| GB | 907454 A | 10/1962 |
| GB | 1011970 A | 12/1965 |
| GB | 1267920 A | 3/1972 |
| JP | 61124752 A | 6/1986 |
| JP | 04165163 A | 6/1992 |
| JP | 08105372 A | 4/1996 |
| JP | 09196200 A | 7/1997 |
| JP | 10205628 A | 8/1998 |

OTHER PUBLICATIONS

ASTM Int'l, Designation D1418-10a: Standard Practice for Rubber and Rubber Latices-Nomenclature, Nov. 2010, pp. 1-3, ASTM Int'l, West Conshohocken, PA, USA.

ASTM Int'l, Designation D1600-99: Standard Terminology for Abbreviated Terms Relating to Plastics, Feb. 2000, pp. 1-10, ASTM Int'l, West Conshohocken, PA, USA.

DuPont, Teflon FEP Resin and Film, retrieved from http://www2.dupont.com/Teflon__Industrial/en__US/products/product__by__name/teflon__fep/index.html, 2013.

Daikin Indus., Ltd., Daikin Fluorochemical Products: Product Overview, retrieved from http://www.daikin.com/chm/products/pdfDown.php?url=pdf/catalog/EZC-2.pdf, 2013.

* cited by examiner

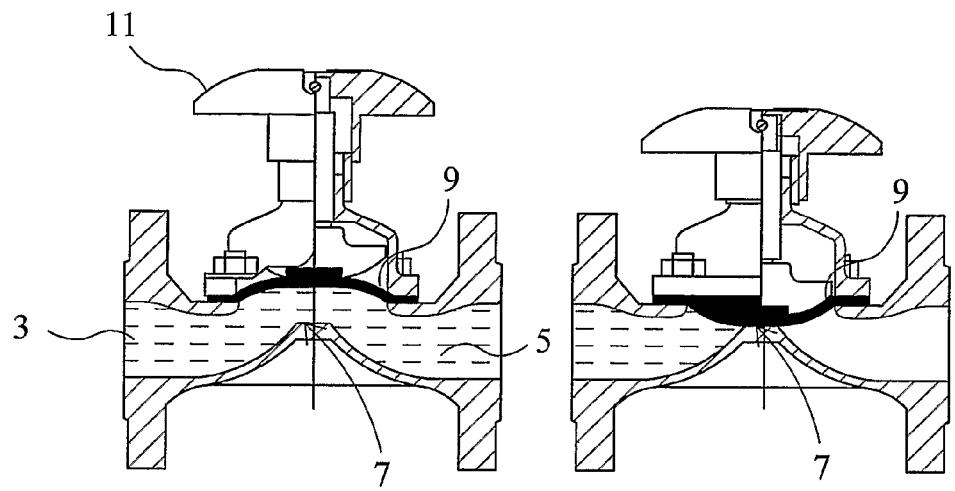
*Fig. 1a*  *Fig. 1b*
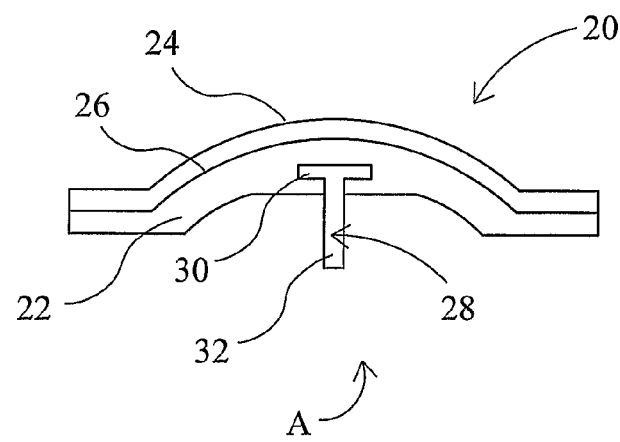
*Fig. 2*

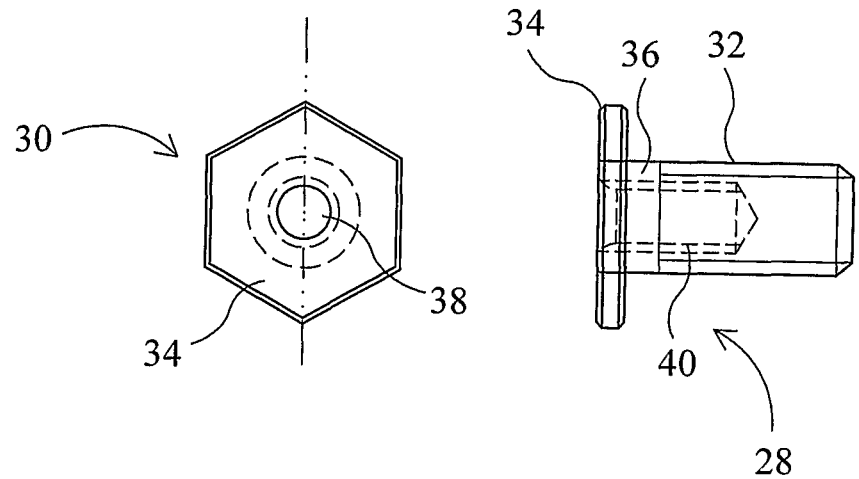
*Fig. 3a*   *Fig. 3b*
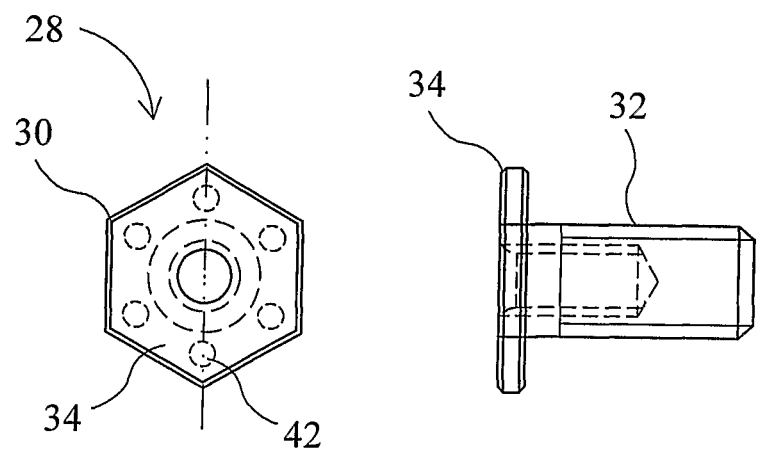
*Fig. 4a*   *Fig. 4b*

DIAPHRAGM FOR A VALVE

This invention relates to diaphragm valves. Preferred aspects of the invention relate to diaphragms for use in diaphragm valves.

Diaphragm valves are widely used, in particular in the pharmaceutical and bioprocessing industries. Such valves function by closing off the flow of media, and can be actuated manually or by other means, for example electronic or pneumatic means.

A diaphragm valve comprises a valve body having two or more ports, a diaphragm, and a seat against which the diaphragm can be moved to close the valve. FIGS. 1a and 1b show a weir type of diaphragm valve in which the valve body 1, has an inlet 3 and an outlet 5 and a seat 7 located between the inlet 3 and outlet 5. A diaphragm 9 is moved between an open position shown in FIG. 1a where it is spaced from the seat 7 and a closed position shown in FIG. 1b where it is located against the seat 7, by a manually operated push-button actuator 11. When the diaphragm 9 is in the closed position, the flow of media through the valve body 1 is prevented.

The form and composition of the diaphragm itself is of importance. This is particularly the case where the diaphragm is to be used in a valve for example in the pharmaceutical or bioprocessing industry where the product coming into contact with the diaphragm (the contact product) might be for example a drug product.

In known arrangements, the diaphragm is typically constructed using elastomers with or without a layer of fabric reinforcement. The reinforcement is normally located centrally through the thickness of the diaphragm, although other arrangements are possible, and aspects of the invention described herein are preferably not restricted as to the particular arrangement used. For example, the reinforcement may be located to one side of the diaphragm. Some diaphragms have a layer of PTFE (or the melt processible TFM Dyneon®) on the 'product contact surface' (referring to the surface contacting the drug or other product which is being sealed). Known diaphragms also contain a stud or bolt bonded into the structure. The stud may screw into the valve actuator to attach the diaphragm to the actuator. The stud or bolt may for example comprise metal or an engineering plastic.

In pharmaceutical and bioprocessing applications, the contact product will typically be water for injection (WFI), or an aqueous solution carrying drug product. Both such products are fairly benign towards elastomers. However, the clean-in-place (CIP) and steam-in-place (SIP) treatments used between product runs are potentially more aggressive to elastomers. These treatments often involve the use of proprietary solutions of sodium and potassium hydroxide, and phosphoric acid. Steam cleaning of bioprocessing systems (using 'clean steam') can be at an elevated temperature of for example 135 degrees C.

Commonly used elastomers for diaphragm manufacture include ethylene-propylene copolymers (EPM) and ethylene-propylene diene monomer (EPDM). When appropriately formulated, these generally have a good resistance to the contact products normally present in the application of diaphragm valves, and excellent resistance to flexing. However, many diaphragms currently used in valves give a short service life due to poor resistance to the high temperature steam used as SIP. The current grades of EPM or EPDM used to manufacture diaphragms often bond to the weir or valve seat during long periods of closure, which can result in damage to the diaphragm when the valve is opened. PTFE or TFM® has been used as a facing material (bonded or loose) on the surface of the diaphragm in an effort to reduce adhesion to the weir or seat, to attempt to mitigate problem of materials leaching from the elastomer and to provide some protection against SIP or other treatments. These facing materials are stiff however, can make the diaphragm product more difficult to fit, and PTFE will often split with repeated flexing. The use of such facing materials can also make it more difficult to obtain an effective seal when the valve is closed.

There has also been proposed the use of Parylene as a polymer bonded to the surface of the diaphragm through vapour deposition. However, there is still considered to be a need for an arrangement having the improved durability and high levels of extensibility of an all-elastomer diaphragm.

A further critical factor, in particular where the diaphragm is used in pharmaceutical or bioprocessing applications, is biocompatibility. Materials in contact with the product must have been tested to and meet the relevant requirements, for example of United States Pharmacopeia (USP) <88>, known as 'USP Class VI'. In some cases a cytotoxicity test to USP <87> will also be carried out. Whilst originally designed for checking the biocompatibility of plastics, the use of such tests for elastomers has become widely accepted. ISO 10993 has similar requirements and is also widely used. However, elastomers that meet these requirements may still possess comparatively high levels of extractable constituents that can leach into the product stream. Diaphragms currently on the market are often sold as being 'USP VI Compliant', ISO 10993 Compliant' and/or 'FDA Compliant' as the elastomer portion in contact with the product does meet these requirements.

It is thought possible however that the fabric reinforcement on the diaphragm, where used, and the metal retaining stud may be bonded to the elastomer using bonding agents/systems that are non-compliant. While it can be argued that for some designs of diaphragm, these parts are not in contact with the product being sealed, end-users are however starting to question the other materials of construction and their compliance. In particular, as in the event of diaphragm failure, these other materials may be exposed to the product.

Other elastomers have been proposed to be used for diaphragms with varying levels of success. Diaphragms including various grades of fluorocarbon (FKM) are offered along with diaphragms produced from 100% PTFE or TFM, though it is known that obtaining the excellent flex properties of EPM or EPDM with these elastomers or machined/formed plastics is difficult.

Aspects of the invention seek to solve or mitigate one or more of these or other problems in known diaphragms.

While aspects of the invention find particular application in relation to the pharmaceutical and bioprocessing applications, aspects of the invention are widely applicable in other applications, for example in relation to food products. Some of these other applications may not require for example biocompatibility or FDA compliance.

According to a first aspect of the invention, there is provided a diaphragm for a diaphragm valve, the diaphragm including a body comprising a first elastomeric material, and further including a layer on a surface of the body, the layer comprising a second elastomeric material.

The first and second elastomeric materials will generally be different from one another. They may comprise different or the same compounds or substances. Preferably the physical and/or chemical properties of the first and second elastomeric materials are different from each other. The elastomeric materials of the body and the layer may have different compositions and/or formulations.

The formulation of the body will generally be made having regard in particular to flexibility of the body and cost. Particularly suitable materials for the body of the diaphragm are EPM and EPDM but other polymers could be used, for example silicone or NBR. Particular polymers could be appropriately compounded to give the desired properties. In particular for pharmaceutical/bioprocessing applications, the body of the diaphragm meets the requirements of the relevant tests. For example, the body of the diaphragm is preferably USP Class VI and/or ISO 10993 compliant even though it is not in direct contact with the drug product during normal use of the valve.

Preferably the hardness of the body elastomer and/or the elastomer of the layer is between about 60 and 80 IRHD (International Rubber Hardness Degrees).

Preferably the layer of second elastomeric material is arranged to be in contact with the product in the valve during use.

The surface layer is preferably a resistant layer. Preferably the surface layer has appropriate chemical resistance for the intended application of the diaphragm. For example, where the diaphragm may be used in pharmaceutical/bioprocessing applications, the material of the surface layer has appropriate resistance not only to the product to be used in relation to the valve, but also any other products used during cleaning or maintenance of the valve or other products to which the diaphragm may be exposed to in use. For example, where the valve is to be subject to a CIP treatment, the surface layer may be required to have an appropriate resistance to phosphoric acid. Preferably the increase in volume of the material of the surface layer is less than 10%, more preferably less than 5% in the presence of the substances to which the material will be exposed during use.

Preferably the surface layer is such that it has a low surface adhesion. Thus the likelihood of the diaphragm becoming adhered to the valve seat during use can be reduced. The surface adhesion may for example be determined by clamping a sample of the material to a valve seat for a period of at least one day at elevated temperature, for example 70 degrees C., releasing the clamp and determining whether adhesion has occurred.

Preferably the surface layer material includes a low amount of extractable constituents, or low extractables. For example, when extracted in accordance with USP<661> preferably the total organic carbon in the surface layer material is less than 50 ppm, preferably less than 20 ppm, more preferably less than 10 ppm, or less than 5 ppm. An amount of 3 ppm or less would be advantageous in some examples.

Preferably the surface layer material meets an appropriate cytotoxicity test, for example USP <87>.

Thus a dual elastomer diaphragm can be provided, where an elastomeric layer is arranged at the product contact surface, to give a diaphragm having a high level of chemical resistance, low surface adhesion (to avoid sticking of the diaphragm to the valve components, for example the valve seat when closed), and low extractables. Preferably the layer extends across all of the surfaces of the diaphragm which would be in contact with the product during normal use of the valve and/or the lifetime of the diaphragm (including any failure). In some arrangements, the layer might be provided on less than the whole of a surface of the diaphragm. For example, a layer of material might be provided in the region where the diaphragm contacts the valve seat, and for example that layer might comprise low adhesion material. The layer itself may comprise one or more layers of material, and/or be provided at one or more regions of the diaphragm.

The use of such a layer can, in preferred examples, give a product contact membrane which is flexible/elastomeric while preventing leak paths through the valve body (which can sometimes be seen with diaphragms including PTFE/TFM), and can be bonded to the EPM or EPDM or other elastomer of the body so that the components of the bond are biocompatible as described further below.

The layer preferably comprises a fluorine-containing elastomeric material, for example a fluoroelastomer. Where the term fluoroelastomer is used herein, preferably it is to be understood to relate broadly to elastomer materials including fluorine. Preferably the fluorine content of the layer material is greater than 60%, preferably greater than 64%, greater than 66%, preferably 68% or more. The fluorinated elastomer may be fluoroelastomer (FKM). Other fluorinated elastomers which would be used include perfluoro elastomers (FFKM), tetrafluoroethylene-propylene copolymer (TFE-P) and tetrafluoro ethylene/propylene rubbers (FEPM). Other types of fluoroelastomer might be used. A fluorine-containing material which could be used is AFLAS (RTM Asahi Glass Co, Ltd).

In a preferred example for some applications, the material provided on the face of the seal includes a fluorinated elastomer.

The layer preferably comprises FKM or FFKM. Suitable material for the resistant layer include for example compounds based on VITON® GF600S or VITON® Extreme polymers (which give lower levels of extractables than PTFE, excellent resistance to process, CIP/SIP media and low adhesion to steel). Other polymer types, or equivalent polymers from other manufacturers may be equally suitable. In examples of the invention, these expensive materials can be used in small amounts as a layer on a diaphragm at relatively low cost.

In other examples, different materials for the layer may be used. For example, EPDM may be used for the layer. In particular, EPDM having low extractables may be used. In an example, the EPDM layer may comprise Elast-O-Pure EP75 black (James Walker Group) and the body may comprise EPDM, for example Elast-O-Pure EP Dynamic. In this example, the EPDM layer material has lower extractables than the EPDM body material (for example about 13 ppm for the layer material compared with about 50 ppm for the body material, when extracted in accordance with USP<661>). In this example, the EPDM body material is, however, more flexible than the EPDM layer material.

Thus, according to eamples of the invention, the body and/or the layer or facing material may include an ethylene-propylene elastomeric material, for example EPM or EPDM. Such materials are preferred in some applications for use as a body material. In some examples, both the body and the layer may include such material. For example, a layer including an EPDM material of a first composition or formulation may be provided as a layer material on a body including an EPDM material of a second composition or formulation of for example a body including an EPM material. In some examples, the body and the layer may include different compositions or formulations of the same material. Thus a similar material may be used on the face as for the body of the diaphragm.

In some applications, it may be preferred for the material of the layer to be the same or similar to material used elsewhere in the system in which the diaphragm is to be used, for example similar to static gaskets used elsewhere. In such examples, the diaphragm body could include for example an EPM/EPDM material optimised for flex resistance, and the layer material may be the same as used elsewhere.

Preferably the layer material is provided at the face of the diaphragm.

The thickness of the layer may be less than about 3.0 mm, preferably less than about 2.0 mm. The thickness of the layer may be greater than about 0.3 mm, preferably greater than about 0.5 mm. The actual thickness would generally be chosen based on the size of the diaphragm and thus in some examples may be 3.0 mm or more.

The layer is preferably bonded to the body. For example a bonding agent may be used. The surface of one or both of the resistant layer and the body may include a textured surface finish. This may increase the contact surface area and therefore may improve bond strength.

In some examples a biocompatible bonding agent is included between the layer and the body. Where used, preferably the bonding agent complies with the relevant standards for compatibility. For example, as discussed above, the elements of the diaphragm, in particular those which may come into contact with the product, meet the appropriate requirements of USP Class VI and/or ISO 10993.

However, in some examples, it may be possible to avoid the use of a bonding agent. The layers may be bonded together during manufacture or moulding of the diaphragm. Alternatively or in addition, the body and layer may include formations arranged to cooperate to provide at least some mechanical binding of the layer to the body. For example, the body and layer may be moulded separately with interlocking features so they 'clip together'.

The diaphragm may include a tie layer between the surface layer and the body, the tie layer including a blend of components of the surface layer and the body.

Preferably the tie layer blend is formed before vulcanization. This will allow the layers to bond together during the moulding process.

The tie layer may include a blend of the surface elastomer of the surface layer, and the body elastomer of the body. The blend preferably includes more of the surface elastomer than of the body elastomer, by weight. Since the fluorinated elastomer material will in many examples have a significantly greater density than that of the elastomer or the body, the ratios by volume of the two elastomers may, in some examples, be similar. For example, the blend may include between about 20% and 45% of the body elastomer, preferably between about 30% and 40%, for example 35% by weight. Other ratios may be possible.

In other arrangements optimized processing conditions and compound formulations, the layers may bond directly without a tie layer or bonding agent being required. For example, this may be possible where the body material and the layer material comprise EPDM. A body of one EPDM material having good flexibility may be faced by a layer including another EPDM having low extractables and low adhesion. In this case, the tie layer might not be needed.

The thickness of the tie layer may be between about 0.3 mm and 1.0 mm. In some arrangements, the thickness might be as low as about 0.1 mm. However, the thickness of the tie layer will depend on the type and/or size of the diaphragm, and thicknesses greater than 1.0 mm may be used.

In another example of manufacturing the diaphragm, the layer is first moulded as a thin portion, for example comprising FKM for product contact. A tie material, for example comprising a mix of elastomer materials diluted in an appropriate solvent, is applied, for example using a brush, onto the thin portion to give a thin layer. The body of the diaphragm would then be moulded against the tie layer on the thin portion.

The diaphragm may include reinforcing material. While the diaphragms of aspects of the present invention may be used without reinforcement, in some cases reinforcement will be used and/or desirable. For example, the diaphragm is to be used for a high pressure application, reinforcement may be advantageous. Any appropriate reinforcement may be used, for example a knitted or woven fabric, for example comprising carbon or aramid fibres.

The reinforcement may be applied to a surface of the diaphragm or an element of the diaphragm. Examples include fabric, plastic and/or metal included in the elastomer material of the body and/or layer and/or for example any bonding layer between them. For example the reinforcement may be bonded to the surface, for example using a bonding agent (which may be biocompatible where this is required in view of the potential application of the diaphragm). The reinforcement may be mechanically bonded to the diaphragm or to an element of the diaphragm. For example, the reinforcement may be included in the diaphragm or a component thereof during its manufacture, for example by moulding. The reinforcement may be at a surface of the diaphragm or within the diaphragm or an element of the diaphragm. For example, the reinforcement may be encapsulated within the diaphragm body during its moulding. The reinforcement and the resistant layer may be bonded to the body of the diaphragm in a single operation. The reinforcement is preferably applied to an opposing surface of the diaphragm to the layer and/or a surface contacting the product in the valve system.

In a further example, the reinforcement is applied to the diaphragm or a component thereof by a surface treatment using plasma (suitable for biocompatibility where required for the potential application of the diaphragm). The plasma may increase the surface activity or 'bondability' of the fabric. This may be used in conjunction with a biocompatible bonding agent, or the plasma may include a bonding element for grafting on to the fabric.

According to a further aspect of the invention, there is provided a method of reinforcing an element comprising elastomeric material, the method including the step of carrying out a surface treatment of a surface of the element, the treatment comprising using a plasma.

The diaphragm may further include a support element. The support element may be provided as a further layer or separate element. Preferably the support element is provided at the actuator side A of the diaphragm (see FIG. 2).

The support element may comprise for example a layer of plastic or metal. The support element may provide support to the diaphragm, for example at high pressures, and/or protect the other parts of the diaphragm from the actuator mechanism or other parts of the valve assembly.

An example of a plastic resin support may comprise a resin, optionally reinforced for example with short fibres of carbon, aramid or similar.

The diaphragm may further include a fixing element for fixing the diaphragm in the valve, preferably an integral fixing element.

Preferably the fixing element is mechanically bonded in the diaphragm, preferably mechanically bonded to the elastomer body of the diaphragm. The fixing element may, for example, comprise a metal and/or plastics material.

In known diaphragm arrangements, a fixing element, for example a metal stud is provided having a head and a shaft. The shaft is adapted to be fixed to the actuator of the valve and the head is bonded to the diaphragm using a chemical bonding agent. As indicated above, it would be advantageous for at least some arrangements for the fixing element to be bonded to the diaphragm without the use of chemical agents, in particular where the diaphragm is to be used in pharmaceutical or bioprocessing applications.

This important feature is therefore provided independently. According to a further aspect of the invention there is provided a diaphragm for a valve assembly, the diaphragm including an elastomeric body and further including a fixing element for fixing the diaphragm to the valve assembly, wherein the fixing element is mechanically bonded to the diaphragm.

Preferably the fixing element is mechanically bonded to the elastomeric body. The fixing element may include a head portion and a shaft portion, the head portion being mechanically bonded to the diaphragm.

A portion of the fixing element, for example the head portion, is preferably embedded in the elastomeric body.

This may be achieved during formation of the elastomeric body and/or the diaphragm, for example during a moulding step.

A portion of the fixing element may have a configuration such that there is mechanical keying between the portion of the fixing element and the elastomeric material.

A portion of the fixing element may porous and/or include apertures or surface formations which preferably enhance mechanical keying of the fixing element and the diaphragm. For example, the portion of the fixing element may comprise a head portion. The portion may have apertures or holes drilled into it, it may have an open-structured configuration, or may comprise porous material, and/or may have surface structure or texture. Such features can allow the elastomeric compound to flow into and effect a mechanical bond with the fixing element.

The fixing element may comprise at least two sections: a first section being adapted for mechanical bonding to the diaphragm; and a second section for fixing to the valve assembly.

In this way only the section being mechanically bonded need be provided during the bonding process. The other section may be fitted after bonding or just before fixing of the diaphragm into the valve assembly. The first section may be a "universal" fitting for all of the diaphragms of a type, for example irrespective of their intended application; the second section might be for example specific to a type of valve assembly. A plurality of different second sections may be available. The first and second sections may be joined together for example by way of an integral pair of mating portions on the two sections, for example integral screw threads. Other means for attaching the two sections can be provided.

The invention also provides a fixing element for use in a diaphragm described herein. The invention also provides a diaphragm having a surface coating layer comprising a fluoroelastomer.

Also provided by the invention is a method of forming a diaphragm as defined herein. According to a further aspect of the invention, there is provided a method of forming a diaphragm the diaphragm including a body comprising a first elastomeric material, and further including a layer on a surface of the body, the layer comprising a second elastomeric material, the method including the steps of providing a diaphragm body comprising the first elastomeric material; providing the second elastomeric material; and bonding a layer of the second elastomeric material on a surface of the body. The layer may be bonded to the body using a biocompatible bonding agent.

Also provided by the invention is a method of forming a diaphragm including a body comprising a first elastomeric material, and further including a layer on a surface of the body, the layer comprising a second elastomeric material, the method including the steps of: forming a tie composition comprising a blend of the first elastomeric material and the second elastomeric material; forming the diaphragm by moulding using the first elastomeric material and the second elastomeric material, wherein, before moulding the tie composition is provided between a region of the first elastomeric material and the second elastomeric material.

The method may further include mechanically bonding a fixing element to the diaphragm. The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

A broad aspect of the invention provides a product including a body comprising a first elastomeric material, and further including a layer on a surface of the body, the layer comprising a second elastomeric material. The invention may find application beyond that of diaphragms.

Preferred features of the present invention will now be described, purely by way of example, with reference to the accompanying drawings, in which:

FIGS. 1*a* and 1*b* show cross sectional side views of a diaphragm valve;

FIG. 2 shows a cross sectional side view of an example of a diaphragm;

FIGS. 3*a* and 3*b* show a top and side view of an example of a fixing element; and FIGS. 4*a* and 4*b* show a top and side view of a further example of a fixing element.

FIG. 2 shows an example of a diaphragm 20. The diaphragm includes an elastomer body 22 having a resistant layer 24 extending across the whole of one surface of the elastomer body 22. The resistant layer 24 is provided at the surface of the diaphragm 20 which will or may be in contact with the product when the diaphragm is in service.

In the present example, the elastomeric body comprises EPM or EPDM, and the resistant layer 24 comprises a fluorinated elastomer. In an example, the resistant layer 24 comprises compounds based on Viton GF600S® (Du Pont), or VITON Extreme polymers.

Between the body 22 and the resistant layer 24 is a tie-layer 26 which effects bonding of the body and the resistant layer.

In the manufacture of the diaphragm, the layer and body are bonded together during vulcanisation. To assist bonding, a tie composition is provided between the body components including the first elastomer and the layer components including the second elastomer. The tie layer preferably includes a blend of the first and second elastomers. This allows the layers to bond together during the moulding process. A typical ratio for the blend for the tie composition will be 35% EPM/EPDM and 65% of the FKM by weight. The thickness of the tie layer 26 is about 0.1 mm or even less and the thickness of the elastomeric layer 24 is between about 0.5 mm and 2.0 mm dependant on the size of the diaphragm. The size of the tie layer would be chosen, for example on the basis of the size of diaphragm. For example, the tie layer could be less than 0.1 mm or, for larger diaphragms might be 1.0 mm.

Whilst the diaphragm may be used without reinforcement, a knitted or woven fabric may be used in the construction. This may rely on a mechanical bond, use a biocompatible bonding agent, or surface treatment using plasma which will be tested for biocompatibility. A further option for reinforcement is a supporting layer of plastic or metal. This will preferably be provided at the 'actuator side' of the diaphragm providing support to the diaphragm at higher pressures, and protecting the diaphragm from the actuator mechanism. The plastic may for example comprise a resin which may be reinforced for example with short fibres of carbon, aramid or similar.

A fixing element 28 is provided in the body 22, the fixing element being in the form of a stud having a head 30 and a stem 32, at least part of the head 30 being embedded into the body 22 and at least a part of the stem 32 of the stud 28 extending out of the body 22 for connection with the valve actuator.

FIGS. 3a and 3b show an example of a fixing element in more detail. The fixing element 28 includes a head 30 and a stem 32. The head 30 includes an upper head element 34 which is generally planar and is hexagonal. It will be understood that the head of the element may be of any shape. Preferably the head is of a configuration so that it is unable to rotate when located in the diaphragm. The head may be square. Behind the upper head element 34 is a collar portion 36 which is generally cylindrical. At the centre portion of the head is a bore 38 which extends generally perpendicular of the plane of the upper head portion 34, through the collar 36 and beyond, the bore extending beyond the collar providing a shaft 40. In an example, an outer surface of the shaft is threaded and the stem 32 has an internal threaded portion so that the head and the stem can be fitted together.

Alternatively, the bore/shaft can be reverse tapered rather than threaded.

In the manufacture of the diaphragm body, the head 30 is included in the moulding process so that the head portion 34 is embedded into the elastomer material. The rubber may flow into the bore and around the head portion 34 thereby increasing the mechanical bonding.

Thus a self retaining fixing element or stud can be provided.

To improve bonding of the fixing element in the diaphragm, the use of a porous or "opened structured" material, in particular for the head portion 34, will allow the rubber compound to flow into an improved mechanical hold of the fixing element. The porous or open structure may be an inherent feature of the material used for the element, or may be provided for example by machining. Preferably the fixing element comprises a metal.

FIGS. 4a and 4b shows a further example of a fixing element which is similar to that of FIGS. 3a and b except that holes 42 have been drilled into the head.

It will be understood that the present invention has been described above purely by way of example, and modification of detail can be made within the scope of the invention.

Each feature disclosed in the description, and (where appropriate) the claims and drawings may be provided independently or in any appropriate combination.

A diaphragm for a diaphragm valve is described. The diaphragm has a body comprising a first elastomer and a resistant layer comprising a second, different, elastomer. Diaphragms described in examples have good flexibility with a high level of chemical resistance and low surface adhesion.

Further layers or coatings of the same or different materials may be provided as a part of the diaphragm.

The invention claimed is:

1. A diaphragm for a diaphragm valve, the diaphragm including a body comprising a first elastomeric material which is an ethylene-propylene elastomer, and further including a layer on a surface of the body, the layer comprising a second elastomeric material which is an ethylene-propylene elastomer, wherein the physical and/or chemical properties of the first and second elastomeric materials are different from each other, and wherein the body and the layer meet the requirements of United States Pharmacopeia <88> Class VI.

2. A diaphragm according to claim 1, wherein the layer includes an ethylene-propylene copolymer ("EPM") and ethylene-propylene diene monomer ("EPDM").

3. A diaphragm according to claim 1, wherein the body includes an ethylene-propylene copolymer ("EPM") and ethylene-propylene diene monomer ("EPDM").

4. A diaphragm according to claim 1, wherein the layer is a resistant
   layer being: (a) chemically resistant, having (b) low surface adhesion and/or (c) low extractables.

5. A diaphragm according to claim 1, wherein the thickness of the layer is less than about 3.0 mm.

6. A diaphragm according to claim 1, wherein the thickness of the layer is greater than about 0.3 mm.

7. A diaphragm according to claim 1 further including a fixing element for fixing the diaphragm in the valve.

8. A method of forming the diaphragm as defined in claim 1, the method including the steps of:
   providing the body comprising the first elastomeric material;
   providing the second elastomeric material; and
   bonding the layer of the second elastomeric material on the surface of the body.

9. A method of forming the diaphragm as defined in claim 1, the method comprising:
   forming the diaphragm by moulding using the first elastomeric material and the second elastomeric material.

10. A diaphragm according to claim 1, wherein the layer includes an ethylene-propylene copolymer ("EPM").

11. A diaphragm according to claim 1, wherein the layer includes ethylene-propylene diene monomer ("EPDM").

12. A diaphragm according to claim 1, wherein the body includes an ethylene-propylene copolymer ("EPM").

13. A diaphragm according to claim 1, wherein the body includes ethylene-propylene diene monomer ("EPDM").

* * * * *